(12) United States Patent
Nibir et al.

(10) Patent No.: US 11,387,667 B2
(45) Date of Patent: Jul. 12, 2022

(54) COMBO BUCK BOOST BATTERY CHARGER ARCHITECTURE WITH REVERSE BOOST MODE

(71) Applicant: Renesas Electronics America Inc., Milpitas, CA (US)

(72) Inventors: Shahriar Nibir, Morrisville, NC (US); Sungkeun Lim, Cary, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 14 days.

(21) Appl. No.: 16/838,886

(22) Filed: Apr. 2, 2020

(65) Prior Publication Data

US 2020/0295588 A1    Sep. 17, 2020

Related U.S. Application Data

(63) Continuation-in-part of application No. 16/452,414, filed on Jun. 25, 2019.

(60) Provisional application No. 62/837,649, filed on Apr. 23, 2019, provisional application No. 62/720,650, filed on Aug. 21, 2018.

(51) Int. Cl.
*H02J 7/00* (2006.01)
*H02J 7/06* (2006.01)

(52) U.S. Cl.
CPC .............. *H02J 7/06* (2013.01); *H02J 7/00711* (2020.01); *H02J 7/007182* (2020.01)

(58) Field of Classification Search
None
See application file for complete search history.

(56) References Cited

U.S. PATENT DOCUMENTS

| | | | |
|---|---|---|---|
| 7,145,317 B1 | 12/2006 | Shah | |
| 7,986,137 B2 | 7/2011 | Laur et al. | |
| 8,000,117 B2 | 8/2011 | Petricek | |
| 9,246,348 B2 | 1/2016 | Solie | |
| 9,601,936 B2 | 3/2017 | Goncalves et al. | |
| 10,985,644 B1 * | 4/2021 | Lam | G06F 1/263 |
| 2007/0096693 A1 | 5/2007 | Palczynski | |
| 2010/0085009 A1 * | 4/2010 | Kang | H02J 7/0016 320/118 |
| 2011/0074357 A1 * | 3/2011 | Parakulam | H01M 8/04955 320/134 |
| 2012/0139345 A1 | 6/2012 | Ye et al. | |
| 2012/0139500 A1 | 6/2012 | Ye et al. | |
| 2014/0184173 A1 * | 7/2014 | Szepesi | H02J 7/0068 320/164 |
| 2015/0280473 A1 | 10/2015 | Zhao et al. | |

(Continued)

*Primary Examiner* — Arun C Williams
(74) *Attorney, Agent, or Firm* — Foley & Lardner

(57) ABSTRACT

The present embodiments are directed to methods and apparatuses for operating a battery charger in computing systems having certain system load requirements, battery configurations and external device power supply support. According to some aspects, the present embodiments provide methods and apparatuses for providing a reverse boost mode of operation when the battery charger is providing system power from a battery, such as when an adapter is not connected. The reverse boost mode of operation according to embodiments provides a regulated output voltage, thereby allowing a load such as a CPU to operate at maximum performance, even when the battery has discharged below a threshold discharge level.

11 Claims, 5 Drawing Sheets

(56) References Cited

U.S. PATENT DOCUMENTS

| | | |
|---|---|---|
| 2016/0204632 A1 | 7/2016 | Kleine et al. |
| 2016/0246316 A1 | 8/2016 | Lim et al. |
| 2016/0268816 A1* | 9/2016 | Mao .................... H02J 7/0068 |
| 2016/0352128 A1 | 12/2016 | Houston et al. |
| 2020/0295588 A1 | 9/2020 | Nibir et al. |

* cited by examiner

COMBO BUCK BOOST BATTERY CHARGER ARCHITECTURE WITH REVERSE BOOST MODE

CROSS-REFERENCE TO RELATED APPLICATIONS

The present application is a continuation-in-part application of the U.S. Non-provisional patent application Ser. No. 16/452,414 filed Jun. 25, 2019, which application claims priority to U.S. Provisional Patent Application No. 62/720,650 filed Aug. 21, 2018. The present application also claims priority to U.S. Provisional Patent Application No. 62/837,649 filed Apr. 23, 2019, the contents of all such applications being incorporated herein by reference in their entirety.

TECHNICAL FIELD

The present embodiments relate generally to mobile and computing devices and more particularly to a battery charger application for such devices that manages and/or postpones system shut down conditions during a battery only mode so as to optimize system performance.

BACKGROUND

Battery chargers, in particular battery chargers for mobile computing devices, are responsible for performing or supporting various operating conditions and applications. For example, conventional mobile computing devices such as laptop or notebook computers include a plug-in port for a power adapter. When the adapter is plugged into this port, the battery charger is responsible for charging the battery using the adapter voltage specified by the manufacturer of the mobile computing device. Likewise, when no adapter is plugged into the dedicated port, the battery charger is responsible for allowing the mobile computing device to operate using energy stored in the battery, and to further support shutdown or near-shutdown conditions when the battery level becomes too low. Although some conventional approaches are acceptable for supporting such shutdown conditions, further opportunities for improvement remain.

SUMMARY

In one or more embodiments, methods and apparatuses allow for a battery only operating mode to transition from an ideal diode mode to a reverse boost mode when the battery is discharged below a threshold level of battery capacity. This can prevent system shutdown problems and extend a maximum CPU performance period, among other aspects.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

As set forth above, according to certain aspects, the present embodiments are directed to methods and apparatuses for operating a battery charger in computing systems having certain system load requirements, battery configurations and external device power supply support. According to further aspects, the present embodiments provide methods and apparatuses for providing a reverse boost mode of operation when the battery charger is providing system power from a battery, such as when an adapter is not connected. The reverse boost mode of operation according to embodiments provides a regulated output voltage, thereby allowing a load such as a CPU to operate at maximum performance, even when the battery has discharged below a threshold discharge level.

Figure 1:
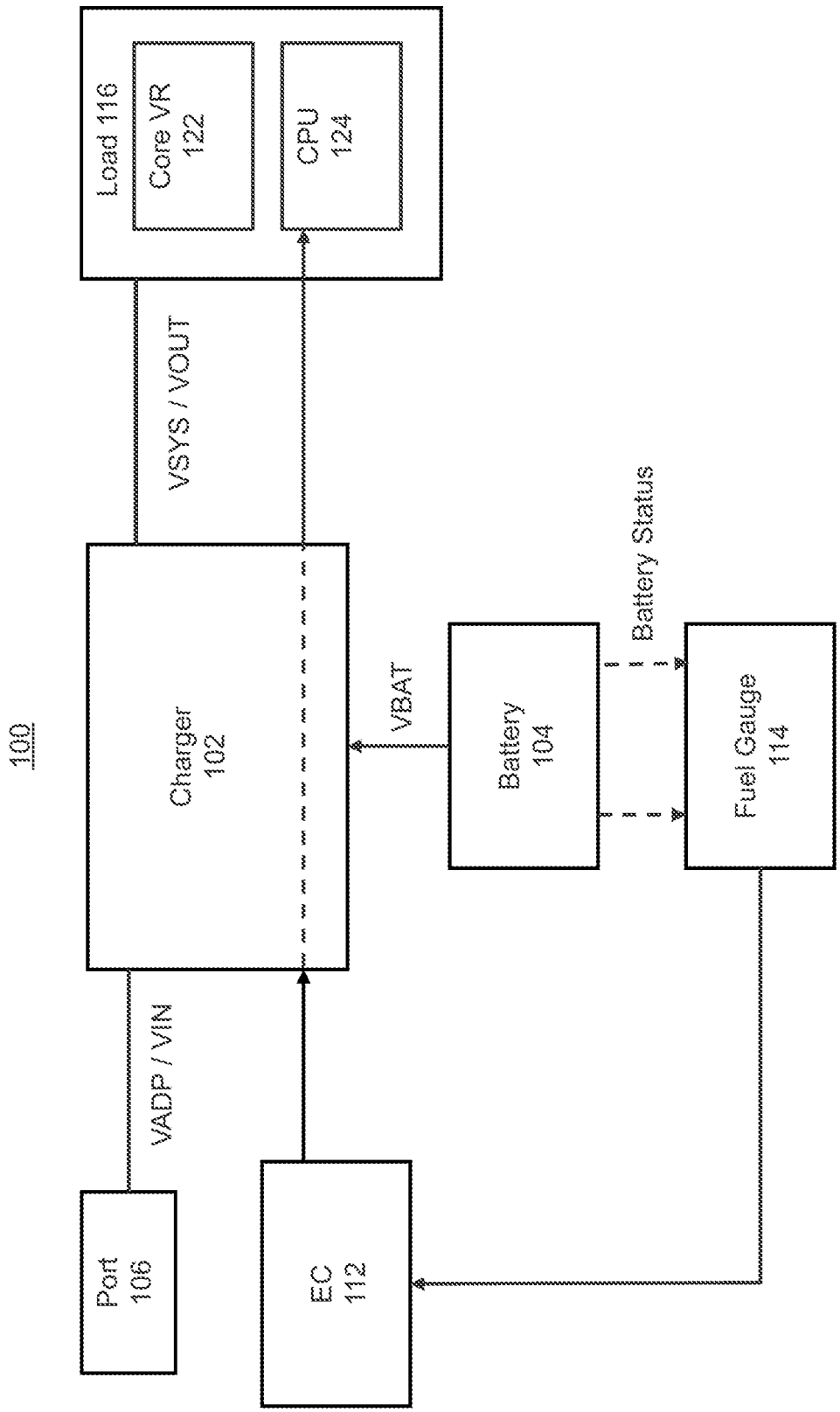
FIG. 1 is a block diagram illustrating an example device or system in which the present embodiments may find useful application.

FIG. 1 is a block diagram illustrating aspects of an example system 100 incorporating the present embodiments. System 100 can be a computing device such as a notebook computer (e.g. MacBook, Ultrabook, etc.), laptop computer, pad or tablet computer (iPad, Surface, etc.), etc., a power bank, a Universal Serial Bus Type C (USB-C) interface platform, or any system using a battery with sensitivity to the supply rail. In these and other embodiments, system 100 includes a load 116, which can include a CPU 124 running a conventional operating system such as Windows, Android or Apple iOS, and can be an x86 processor from Intel, AMD or other manufacturers, as well as other processors made by Freescale, Qualcomm, DSPs, GPUs, etc. Load 116 can further includes a core voltage regulator 122 for supplying a regulated voltage to CPU 124 from the output VSYS/ VOUT of charger 102. It should be apparent that system 100 can include many other components not shown such as solid state and other disk drives, memories, peripherals, displays, user interface components, etc. According to certain aspects, a system 100 in which the present embodiments can find particularly useful application has operational power needs that can exceed the power limits of technologies such as USB-A, for example over 60 watts. However, the present embodiments are not limited to applications in such systems.

As shown, system 100 includes a battery 104 and a battery charger 102. In embodiments, charger 102 is a buck-boost narrow output voltage DC (NVDC) charger (i.e. DC-DC converter). According to certain general aspects, during normal operation of system 100, when a power adapter is plugged into port 106, battery charger 102 is configured to charge battery 104. Preferably, in addition to charging battery 104, battery charger 102 is further adapted to convert the power from the adapter to a voltage suitable for supplying to components of the system 100, including load 116 (e.g., in a buck mode, a boost mode, or a buck-boost mode as is known in the art). According to certain other general aspects, when a power adapter is not plugged into port 106, battery charger 102 is configured to manage the supply of power to the load 116 and/or a peripheral device connected to port 106 from battery 104 (e.g., in a buck mode, a boost mode, or a buck-boost mode as is known in the art). Further details of battery charger 102 according to the present embodiments will be provided below.

In notebook computer (e.g. Ultrabook) and other embodiments of system 100, battery 104 can be a rechargeable 1S/2S/3S/4S (i.e. 1 cell, 2 cell, 3 cell, or 4 cell stack) Lithium-ion (Li-ion) battery. In these and other embodiments, port 106 can be a USB port, such as a USB Type C (USB-C) port or a USB Power Delivery (USB PD) port. Although not shown in FIG. 1, switches between port 106 and charger 102 can also be provided for controllably coupling power from an adapter connected to port 106 to charger 102, or alternatively providing system power to charger 102 and/or port 106. Such switches can also include or be implemented by active devices such as back-to-back FETs (not shown).

As further shown, example system 100 in which the present embodiments can find useful applications includes an embedded controller (EC) 112. EC 112 includes functionality for controlling certain operations of charger 102 and is generally responsible for managing power configurations of system 100 (e.g. depending on whether a power adapter is connected or not connected to port 106, as detected and reported by a port controller coupled to port 106 (not shown)), receiving battery 104 status from fuel gauge 114, and for communicating battery charge levels and other operational control information to charger 102 and CPU 124 (e.g. via SMbus or I2C interface), as will become more apparent from the descriptions below.

According to certain aspects, the present applicant recognizes various problems afflicting conventional battery chargers such as that shown in FIG. 1, and/or adapters incorporating voltage regulators or converters.

For example, with reference to FIG. 1, charger 102 can be configured to operate in a "battery only" mode in the standard battery charger application, for example when an adapter is not plugged into port 106. During this time, charger 102 provides the battery voltage to VSYS/VOUT by causing current to be drawn from battery 104 (e.g. using an "ideal diode" mode as is known to those skilled in the art). Also during this time, fuel gauge 114 continuously monitors the battery voltage and sends the battery charge information to EC 112.

Figure 2:
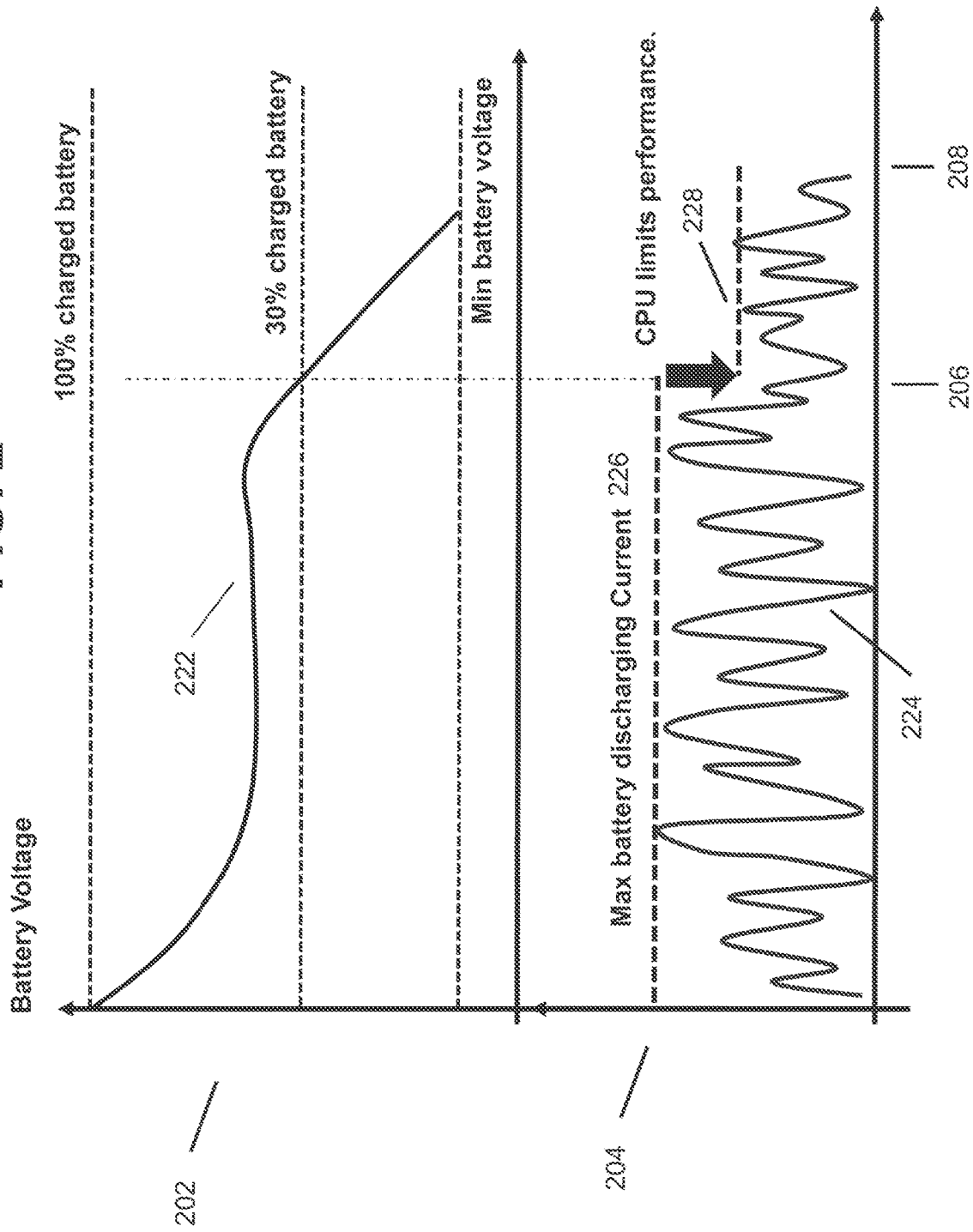
FIG. 2 is a diagram illustrating some problems in the standard battery charger application.

FIG. 2 provides two graphs illustrating system operation in such a "battery only" mode. The top graph 202 illustrates battery voltage (shown by curve 222) as a function of time while the bottom graph 204 illustrates battery discharging current (shown by curve 224) as a function of the same time. As can be seen, the battery discharging current (shown by curve 224) varies over time, based on the operating requirements of load 116, but never exceeding a maximum discharging current level 226 (e.g. as limited by the CPU 124 or core VR 122). At the same time, charger 102 is responsible for providing power from battery 104 (e.g. using an "ideal diode" mode known to those skilled in the art) to the output node VOUT/VSYS. Meanwhile, under this conventional scenario, core VR 122 operates to provide a regulated voltage to CPU 124 from the node VOUT/VSYS.

Meanwhile, with reference to FIG. 1, the battery voltage shown by curve 222 is continuously monitored by fuel gauge 114, and this information is provided to EC 112. In some implementations, EC 112 determines a maximum and minimum capacity of battery 102 based on the number of battery cells used to implement battery 102. For example, in a two-cell (e.g. 2S) battery case, the maximum battery voltage is 2×4.2V=8.4 V, and the minimum battery voltage is 2×3V=6V. In such an example, a 30% charged battery level is slightly higher than 6V.

As shown at time 206, when the battery is discharged down to about 30% of battery capacity (as monitored by fuel gauge 114) this information is provided to EC 112 and communicated to CPU 124. At this point, the CPU 124 has to limit system load current from a maximum level 226 to a reduced level 228 to prevent imminent system shut down. As further shown in FIG. 2, if the battery continues discharging without supplemental power from an adapter or elsewhere, at a subsequent time 208, the battery voltage will reach a minimum level of charge (e.g. about 5V in a 2S example as described above), at which time CPU 124 and/or EC 112 will have no choice but to shut the system down (e.g. via a power-on-reset (POR)).

According to certain aspects, the present Applicant recognizes that it would be advantageous to postpone or eliminate the reduced performance of CPU 124 during the period between times 206 and 208 as described above. For example, in gaming laptops and other applications, if CPU performance is restricted, then those systems may struggle to run games at low battery levels which is unacceptable for the gamer/user. Similar issues are also applicable for web content developers and/or video editors. Moreover, even during the period between times 206 and 208, when operating in a conventional "ideal diode" mode, the load 116 is only receiving the increasingly lower battery voltage indicated by curve 222. As such, load 116 is vulnerable to "load insertion" (e.g., when another device other than CPU 124 is connected to system 100) or other events which may cause the battery discharge current to spike. Such events may cause the system voltage seen by the load 116 to drop below the designated minimum battery voltage (e.g., as a result of the voltage drop caused by the increased drain-source current and drain-source resistance of the ideal diode).

In accordance with these and other aspects, embodiments address these and other issues by providing a reverse boost mode (in contrast to the conventional "ideal diode" mode) to allow the CPU 124 to continue to operate at full performance, and with a regulated voltage, even when the battery level has fallen below a specified level of charge. Although the operation of the reverse boost mode according to embodiments may make it necessary to fully shut the system down sooner than in the conventional approaches, this tradeoff is desirable in many situations such as those described above.

Figure 3:
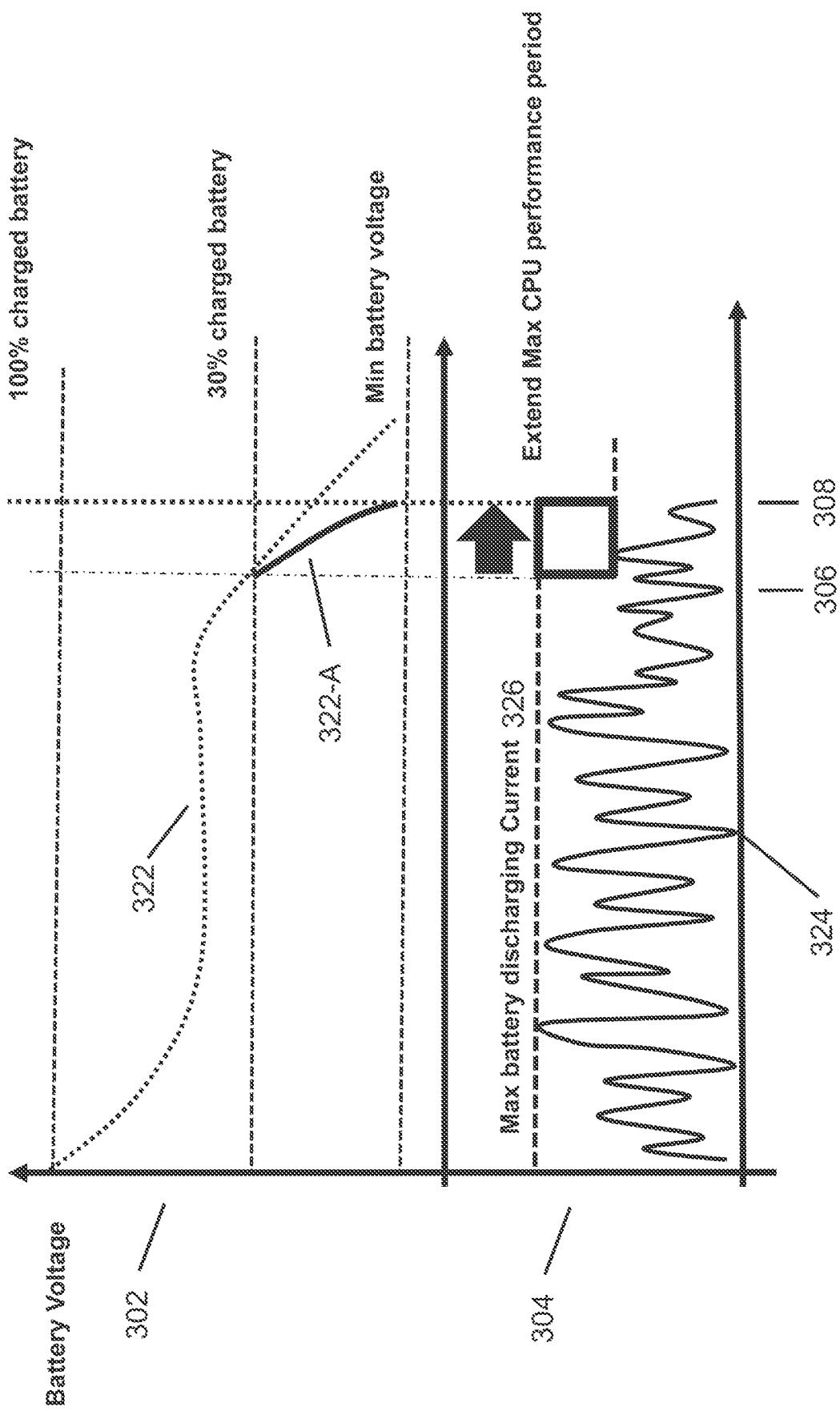
FIG. 3 is a diagram illustrating example aspects of a reverse boost mode according to the present embodiments.

FIG. 3 illustrates example aspects of a reverse boost mode according to the present embodiments. Similar to FIG. 2, the top graph 302 illustrates battery voltage (shown by curve 322) as a function of time while the bottom graph 304 illustrates battery discharging current (shown by curve 324) as a function of the same time. As can be seen, the battery discharging current (shown by curve 324) varies over time, based on the operating requirements of load 116, but never exceeding a maximum discharging current level 326 (e.g. as limited by CPU 124 or core VR 122 as described above). Differently from the conventional operation shown in FIG. 2, as can be seen in FIG. 3, when the battery is discharged below about 30% of battery capacity at time 306, the reverse boost mode according to embodiments is enabled. As a result, system shut down is prevented without any CPU performance limitation, and with a regulated voltage (as opposed to only the battery voltage), for an extended period until time 308, albeit at the expense of the battery discharging to a minimum level sooner than conventional approaches, as indicated by section 322-A of curve 322. As will described in more detail below, in one example of a reverse boost mode according to embodiments, one or more battery control transistors (e.g. FETs) and a pair of bypass transistors (FETs) are controlled in a certain way to regulate the system voltage at any value and prevent system shut down without any limitation of the CPU performance.

Figure 4:
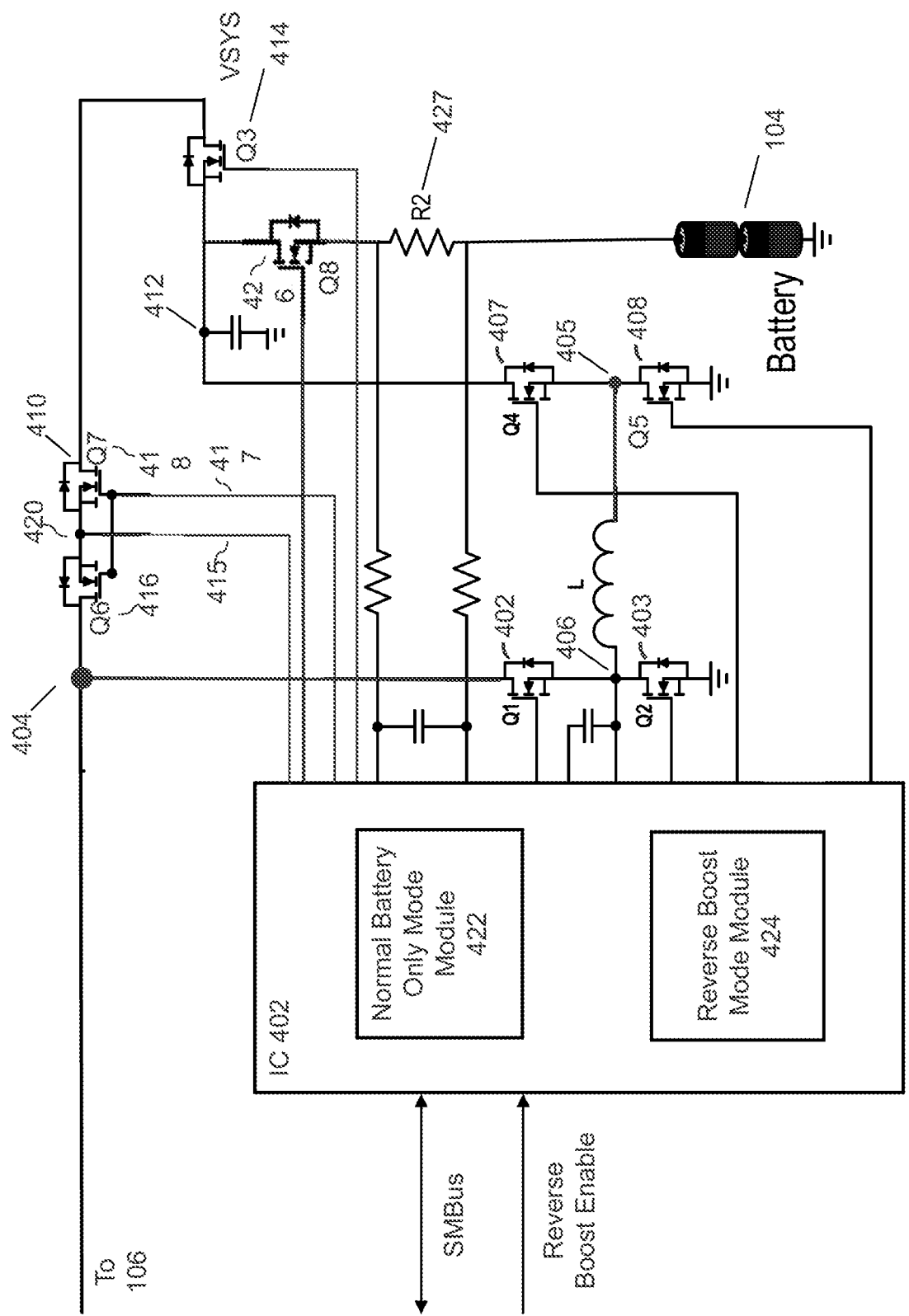
FIG. 4 is a schematic diagram illustrating an example implementation of the present embodiments in a battery charger architecture including an integrated circuit.

FIG. 4 is a schematic block diagram illustrating one example of a detailed implementation of the present embodiments in a battery charger architecture such as that shown in FIG. 1 using an integrated circuit 402. Although the illustrated example charger 102 to be described in more detail below is a buck-boost charger, the present embodiments are not limited to this example, and can include other types of chargers such as buck and/or boost chargers.

The example charger 102 in these embodiments includes power switching transistors including a field-effect transistor (FET) Q1 402, having its drain coupled to node 404 and its source coupled an intermediate node 406. Another FET Q2 has its drain coupled to node 406 and its source coupled to a reference (e.g. GND). The example charger 102 further includes a FET Q4 407 having its drain coupled to a node 412 and its source coupled to an intermediate node 405 and a FET Q5 408 having its drain coupled to the node 405 and its source coupled to the GND. Those skilled in the art may appreciate that the FETs Q1 402, Q2 403, Q4 407, and Q5 408 are coupled in a buck-boost configuration, more specifically, an H-bridge buck-boost configuration. In other embodiments, any other type of buck-boost configuration in the art can be used as well.

Additionally, the charger 102 includes a FET Q6 416 having its drain coupled to the node 404 and its source coupled an intermediate node 420; and a FET Q7 418 having its source coupled to the node 420 and its drain coupled to an output node 410. As mentioned above, the FETs Q6 416 and Q7 418 can implement back-to-back bypass FETs, which provide an additional control for allowing power to be transferred from the adapter to the load. Other examples can also include a single bypass FET. This arrangement of bypass FETs results in a configuration having a common source 415, also referred to as a bypass source. The gate of the FET Q6 416 and the gate of the FET Q7 418 are also coupled together and may be referred to as a bypass gate 417. Both bypass source 415 and bypass gate 417 are coupled to the IC 402 so as to allow the IC 402 to control operation of the bypass FETs. The charger 102 includes an inductor L1 coupled between node 406 and the node 405. As shown, the output node 410 provides a system voltage VSYS to a system load 416 such as a CPU (not shown).

Charger 102 in this example further includes a pair of battery control transistors FET Q3 414 (e.g. NGATE) and FET Q8 426 (e.g. BGATE). The NGATE FET Q3 414 has its drain coupled to node 410 and its source coupled to node 412. The BGATE FET Q8 426 has its drain coupled to the node 412 and its source coupled to the battery 104 via resistor R2 427. As mentioned above, the FETs Q3 414 and Q8 426 can implement the battery control transistor(s). The gates of FET Q3 414 and Q8 426 are coupled to the IC 402 for controlling charge and discharge of the rechargeable battery 104. For example, when the power adapter is not connected, the FETs Q3 414 and Q8 426 may be turned on to allow power from battery 104 to be provided to the system load via node 410. When the power adapter is connected, the FET Q3 414 may be turned on and the FET Q8 426 may be controlled in a linear manner to control charging of the rechargeable battery 104 as known to those skilled in the art.

The FETs Q1 402, Q2 403, Q4 407, Q5 408, Q3 414, Q6 416, Q7 418 and Q8 426 are shown as being implemented using N-channel MOSFETs, although other types of switching devices are contemplated, such as P-channel devices, other similar forms (e.g., FETs, MOS devices, etc.), bipolar junction transistor (BJTs) and the like, insulated-gate bipolar transistors (IGBTs) and the like, etc.

As shown, IC 402 according to the present embodiments includes normal mode module 422 and a reverse boost mode module 424 that respectively control operation of transistors Q1 402, Q2 403, Q4 407, Q5 408, Q3 414, Q6 416, and Q7 418 via output connections to the gates thereof during a normal mode and during a reverse boost mode. Modules 422 and 424 are shown separately for ease of illustration but can include common circuitry, including circuitry also shared by modules for controlling other operations of system 100 by IC 202. Additionally and relatedly, although the present descriptions will focus on IC 402 operating in a battery only mode such as when an adapter is not connected to port 106, it should be apparent that IC 402 can include additional modules and/or functionality for operating in other modes, such as when a power adapter is connected to port 106 and battery 104 is being charged. The details of such additional functionality and/or circuitry will be omitted here for sake of clarity of the present embodiments.

Normal mode module 422 operates FETs Q1 402, Q2 403, Q4 407, Q5 408, and Q3 414 in a buck or a boost mode or a buck-boost mode to regulate the output voltage VSYS to a narrow DC range for stable system bus voltage. In this mode, the bypass FETs Q6 416 and Q7 418 are turned off and maintained in an off state, while NGATE FET Q3 414 is turned on. Module 422 can operate when system power is provided from the adapter, battery, or a combination of both (e.g., with only the battery 104 connected, with only an adapter connected to port 106, or a combination of both). As such, in embodiments, module 422 is configured to operate in a variety of power and load conditions, such as battery 104 configurations of 2-, 3- or 4-cell Li-ion batteries, input voltages having a range of 3.2 V to 23.4 V, and system output voltages VSYS having a range of 2.4 V to 18.304 V.

More particularly, in a battery only mode (e.g. as communicated to IC 402 by EC 112), module 422 initially operates to turn off FETs Q1 402, Q2 403, Q4 407, Q5 408, turn off the bypass FETs Q6 416 and Q7 418, and turn on the NGATE FET Q3 414 and BGATE FET Q8 426 so as to implement a conventional "ideal diode" mode where power from battery 104 is being provided directly to node 410. Various known techniques can be used to implement module 422 to perform this "ideal diode" mode operation (e.g. maintaining NGATE FET Q3 414 and BGATE FET Q8 426 in a substantially ON state), and so further details thereof will be omitted here for sake of clarity of the invention. During this mode, module 422 does not provide any voltage regulation, and so the voltage from battery 104 is provided to node 410. However, it should be apparent that this voltage is reduced by the current drawn from battery 104 multiplied by the resistance R2 427 and the drain-source resistances of NGATE FET Q3 414 and BGATE FET Q9 426. Moreover, as shown in FIGS. 2 and 3, this battery voltage will decrease over time as the battery is discharged.

According to aspects of the present embodiments, however, when a "reverse boost enable" signal is received by IC 402 (e.g. from EC 112, when a predefined battery charge level is breached, such as 30% maximum battery charge, as detected by fuel gauge 114), normal mode module 422 is disabled, and reverse boost mode module 424 is activated. During this mode, module 424 turns off the NGATE FET Q3 414 (e.g. maintains the NGATE FET in an OFF state), turns on the bypass FETs Q6 416 and Q7 418, and operates FETs Q1 402, Q2 403, Q4 407, and Q5 408 in a reverse boost switching mode so as to provide a regulated voltage to the load via output node 410. Those skilled in the art understand how to implement a boost mode of operation using switching transistors such as Q1 402, Q2 403, Q4 407, and Q5 408 and control signals such as pulse width modulated (PWM) signals so as to provide a regulated output voltage, and so further details thereof will be omitted here for sake of clarity of the invention.

Figure 5:
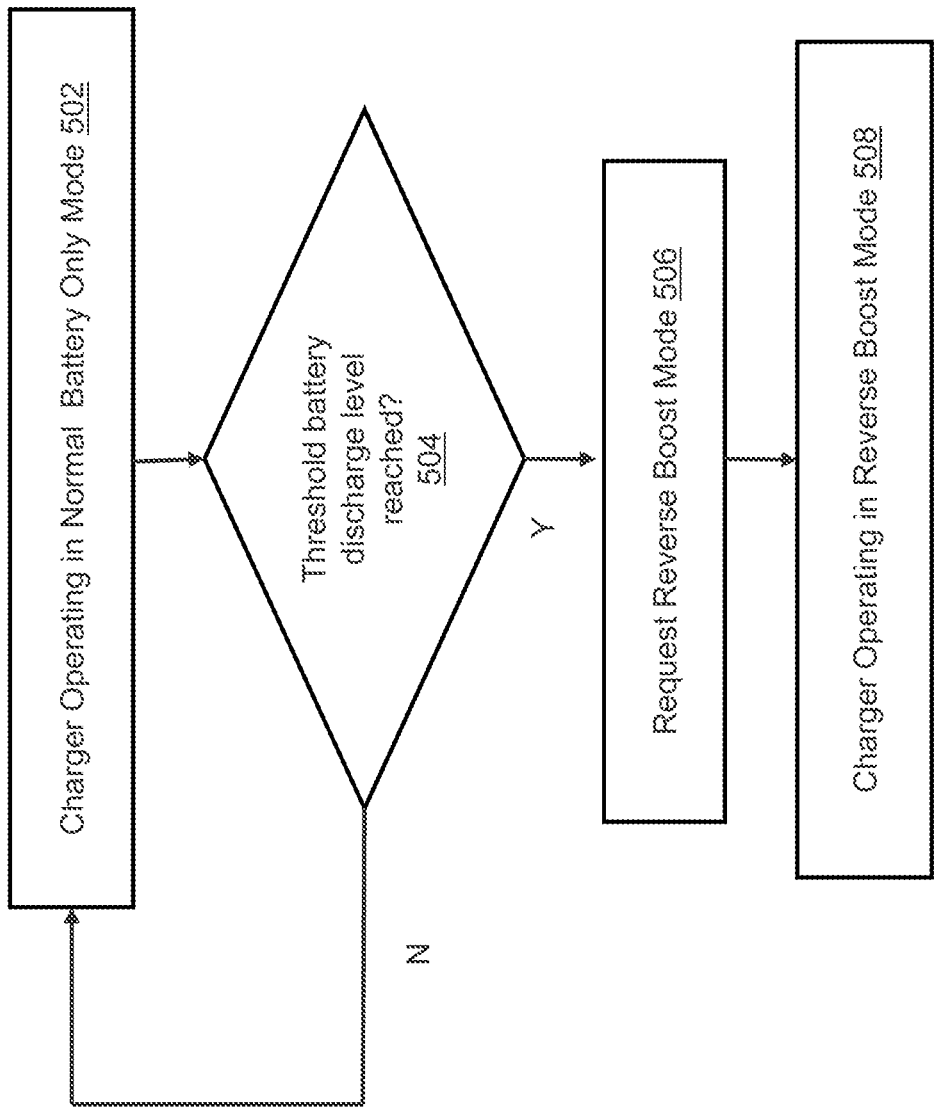
FIG. 5 is a flowchart illustrating an example methodology according to embodiments.

FIG. 5 is a flowchart illustrating an example reverse boost mode methodology that can be implemented by a charger 102 such as that shown in FIG. 4 according to embodiments.

For illustration, FIG. 5 shows charger 102 operating in a normal battery only mode in block 502. This can be in response to IC 402 receiving an indication from EC 112 (e.g. via I2C, SMBus, etc.) that an adapter is not connected to port 106, for example. In the example of FIG. 4, the normal battery only mode can include normal mode module 422 turning off FETs Q1 402, Q2 403 Q4 407, and Q5 408, turning off the bypass FETs Q6 416 and Q7 418, and turning on the FETs Q3 414 and Q8 426 to enable an "ideal diode" mode so as to provide the voltage from battery 104 to the output node 410.

Block 504 indicates that EC 112 continuously monitors information from fuel gauge 114. In block, EC 112 compares the information from fuel gauge 114 to determine whether the battery 104 has discharged down to a predetermined level, such as 30% of maximum battery charge, based on the number of cells that implement battery 104, for example.

If EC 112 determines that the threshold discharge level has been reached, in block 506, EC 112 can request that charger 102 transition to reverse boost mode from a normal battery only mode by signaling that reverse boost is enabled. EC 112 can do this by writing certain values to registers via SMBus, for example one or more bits of one or more control registers of charger 102. EC 112 can also perform certain operations to direct charger 102 to regulate VSYS to a certain target voltage (e.g. via SMbus). In other embodiments, charger 102 determines the target voltage independently (e.g. by using information related to the adapter voltage level).

In response to the indication that reverse boost mode is requested in block 506, charger 102 reverse boost mode operation of charger 102 is commenced in block 508. This block includes disabling the operation of normal mode module 422 and enabling the operation of reverse boost module 424. During this mode, module 424 turns off FET Q3 414, turns on the bypass FETs Q6 416 and Q7 418, and operates FETs Q1 402, Q2 403, Q4 407, and Q5 408 in a reverse boost switching mode so as to provide a regulated voltage corresponding to the target voltage and higher than the battery voltage to the load via output node 410. To perform this voltage regulation, module 424 can monitor the voltage at output node 410 using feedback circuitry (not shown) and generate PWM switching signals to Q1 402, Q2 403, Q4 407, Q5 408 using techniques known to those skilled in the art.

It should be noted that the reverse boost mode of the present embodiments can be set-and-forget by customers and so overhead processing to monitor and protect the system or the battery is not needed.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for operating a battery charger in a battery only mode when a battery is being used to provide power to a load, the method comprising:
   receiving a first indication of the battery only mode;
   causing, responsive to the first indication, a voltage from the battery to be provided to the load via a pair of battery control transistors;
   receiving a second indication that the battery has discharged below a threshold level; and
   causing, responsive to the second indication, a regulated voltage to be provided to the load from the battery using a plurality of switching transistors coupled in a buck-boost configuration, by operating the battery charger in a reverse boost mode, the switching transistors different than the pair of battery control transistors and at least a pair of bypass transistors,
   wherein the reverse boost mode comprises maintaining an NGATE FET of the pair of battery control transistors in an OFF state and the pair of bypass transistors in an ON state.

2. The method of claim 1, wherein causing the voltage from the battery to be provided to the load includes transitioning the battery charger from an ideal diode mode to the reverse boost mode.

3. The method of claim 2, wherein the ideal mode comprises maintaining the pair of battery control transistors in an ON state and the pair of bypass transistors in an OFF state.

4. The method of claim 1, wherein receiving the first and second indications includes receiving signals from an external entity.

5. The method of claim 4, wherein the external entity comprises an embedded controller.

6. A battery charger having a battery only mode when a battery is being used to provide power to a load, comprising:
   a normal mode module that is configured to cause a voltage from the battery to be provided to the load via a pair of battery control transistors; and a reverse boost module that is configured to, in response an indication that the battery has discharged below a threshold level, cause a regulated voltage to be provided to the load from the battery using a plurality of switching transistors coupled in a buck-boost configuration, by operating the battery charger in a reverse boost mode, the switching transistors different than the pair of battery control transistors and at least a pair of bypass transistors, wherein the reverse boost mode comprises maintaining an NGATE FET of the pair of battery control transistors in an OFF state and the pair of bypass transistors in an ON state.

7. The battery charger of claim 6, wherein the reverse boost mode comprises controlling the switches using pulse width modulated control signals.

8. The battery charger of claim 6, wherein the normal mode module is configured to cause the voltage from the battery to be provided to the load by operating the battery charger in an ideal diode mode.

9. The battery charger of claim 8, wherein the ideal mode comprises maintaining the pair of battery control transistors in an ON state and the pair of bypass transistors in an OFF state.

10. The battery charger of claim 6, wherein the indication is received from an external entity.

11. The battery charger of claim 10, wherein the external entity comprises an embedded controller.

\* \* \* \* \*